(12) United States Patent
Nagamori et al.

(10) Patent No.: US 10,177,395 B2
(45) Date of Patent: Jan. 8, 2019

(54) ELECTRODE CATALYST, COMPOSITION FOR FORMING GAS DIFFUSION ELECTRODE, GAS DIFFUSION ELECTRODE, MEMBRANE-ELECTRODE ASSEMBLY, FUEL CELL STACK, METHOD FOR PRODUCING ELECTRODE CATALYST, AND COMPOSITE PARTICLE

(71) Applicant: N.E. CHEMCAT CORPORATION, Tokyo (JP)

(72) Inventors: Kiyotaka Nagamori, Bando (JP); Tomoteru Mizusaki, Bando (JP); Yoko Nakamura, Bando (JP); Hiroshi Igarashi, Bando (JP); Yasuhiro Seki, Bando (JP)

(73) Assignee: N.E. CHEMCAT CORPORATION, Tokyo (JP)

( * ) Notice: Subject to any disclaimer, the term of this patent is extended or adjusted under 35 U.S.C. 154(b) by 0 days.

(21) Appl. No.: 15/316,929

(22) PCT Filed: Mar. 30, 2016

(86) PCT No.: PCT/JP2016/001837
§ 371 (c)(1),
(2) Date: Dec. 7, 2016

(87) PCT Pub. No.: WO2016/157897
PCT Pub. Date: Oct. 6, 2016

(65) Prior Publication Data
US 2018/0013158 A1 Jan. 11, 2018

(30) Foreign Application Priority Data
Mar. 31, 2015 (JP) .................................. 2015-070752

(51) Int. Cl.
*H01M 4/92* (2006.01)
*H01M 8/1004* (2016.01)
(Continued)

(52) U.S. Cl.
CPC .......... *H01M 8/1004* (2013.01); *B01J 23/44* (2013.01); *B01J 35/08* (2013.01); *B01J 37/02* (2013.01);
(Continued)

(58) Field of Classification Search
None
See application file for complete search history.

(56) References Cited

U.S. PATENT DOCUMENTS

2006/0134505 A1   6/2006   Wang et al.
2011/0129763 A1*  6/2011   Lee .................... B22F 1/025
                                                  429/532
(Continued)

FOREIGN PATENT DOCUMENTS

JP   2013-13878 A    1/2013
JP   2013-139638 A   7/2013
(Continued)

OTHER PUBLICATIONS

International Search Report dated Jun. 28, 2016, issued in counterpart International Application No. PCT/JP2016/001837 (2 pages).

*Primary Examiner* — Wojciech Haske
(74) *Attorney, Agent, or Firm* — Westerman, Hattori, Daniels & Adrian, LLP (57) ABSTRACT

To provide electrode catalyst (core-shell catalyst) having an excellent catalyst activity which contributes to lower the cost of the PEFC. The electrode catalyst has catalyst particles supported an a support. The catalyst particle has a core part containing simple Pd and a shell part containing simple Pt. A percentage $R_C$ (atom %) of the carbon of the support
(Continued)

and a percentage $R_{Pd}$ (atom %) of the simple Pd in an analytical region near a surface measured by X-ray photoelectron spectroscopy (XPS) satisfy the conditions of the following equation (1): $2.15 \leq [100 \times R_{Pd}/(R_{Pd}+R_C)]$.

7 Claims, 3 Drawing Sheets

(51) Int. Cl.
  *B01J 23/44* (2006.01)
  *B01J 35/08* (2006.01)
  *B01J 37/02* (2006.01)
  *H01M 4/86* (2006.01)
  *H01M 4/88* (2006.01)
  *H01M 8/1018* (2016.01)
(52) U.S. Cl.
  CPC ............ *H01M 4/86* (2013.01); *H01M 4/8657* (2013.01); *H01M 4/92* (2013.01); *H01M 4/921* (2013.01); *H01M 4/926* (2013.01); *H01M 4/8807* (2013.01); *H01M 2008/1095* (2013.01)

(56) References Cited

U.S. PATENT DOCUMENTS

| | | | |
|---|---|---|---|
| 2012/0183869 A1* | 7/2012 | Jin | .................... H01M 4/8657 429/405 |
| 2014/0038078 A1 | 2/2014 | Shao | |
| 2016/0218372 A1 | 7/2016 | Nanba | |

FOREIGN PATENT DOCUMENTS

| | | |
|---|---|---|
| JP | 2014-516465 A | 7/2014 |
| JP | 2015-47536 A | 3/2015 |

* cited by examiner

ELECTRODE CATALYST, COMPOSITION FOR FORMING GAS DIFFUSION ELECTRODE, GAS DIFFUSION ELECTRODE, MEMBRANE-ELECTRODE ASSEMBLY, FUEL CELL STACK, METHOD FOR PRODUCING ELECTRODE CATALYST, AND COMPOSITE PARTICLE

TECHNICAL FIELD

The present invention relates to an electrode catalyst having a core-shell structure. Particularly, the present invention relates to an electrode catalyst suitable usable for a gas diffusion electrode, more suitably usable for a gas diffusion electrode of a fuel cell.

Also, the present invention relates to a composition for forming a gas diffusion electrode including the electrode catalyst particles, a membrane-electrode assembly, and a fuel cell stack.

Further, the present invention relates to a method for producing the electrode catalyst.

Furthermore, the present invention relates to a composite particle which is used as a structural material of a core part of the electrode catalyst having the core-shell structure.

BACKGROUND ART

A solid polymer electrolyte fuel cell (Polymer Electrolyte Fuel Cell: hereinafter called "PEFC" as needed) has been developed as a fuel cell vehicle, a home cogeneration system, and the like.

As a catalyst used for the gas diffusion electrode of PEFC, a noble metal catalyst composed of a noble metal of platinum group elements such as platinum (Pt).

For example, as a typical conventional catalyst, there has been known "Pt on carbon catalyst" which is a powder of catalyst particles where Pt fine particles are supported on an electrically conductive carbon powder (hereinafter called "Pt/C catalyst" as needed).

For example, as the Pt/C catalyst, there has been known a Pt/C catalyst having a Pt support rate of 50 wt %, Trade Name: "NE-F50" available from N.E.CHEMCAT.

In the preparation costs of PEFC, a proportion of the noble metal catalyst such as Pt is large, and it is the problem to lower the PEFC cost and to spread PEFC.

To solve the problem, developments of technique for lowering the Pt in the catalyst layer of PEFC have been progressed. For example, in Non-Patent Document 1, there is described a summary of the developments until now.

Among these developments, in order to reduce the amount of platinum to be used, a powder (hereinafter called "core-shell catalyst" as needed) of a catalyst particle having a core-shell structure formed by a core part made of non-platinum element and a shell part made of Pt (hereinafter called "core-shell catalyst particle" as needed) has been studied, and there are many reports.

For example, in Patent Document 1, there is disclosed a particle composite material (corresponding to the core-shell catalyst particle) having a structure where palladium (Pd) or a Pd alloy (corresponding to the care part) is covered with an atomic thin layer of Pt atom (corresponding to shell part). Further in Example of this Patent Document 1, a core-shell catalyst particle having a structure where the core part is a Pd particle and the shell part is a layer made of Pt is described.

Further, for example, in Non-Patent Document 1, there is reported that a Pt on carbon catalyst (Pt/C) using a porous fine carbon power (carbon black) as a support has many fine pores in its inside, and Pt particles supported in the fine pores cannot be used effectively in the real reaction.

Furthermore in Non-Patent Document 1, there are disclosed two approaches for using the Pt in the above fine pores effectively, one approach where a high molecular electrolyte having a low molecular chain is designed and synthesized to disperse in the nano fine pores, and another approach to decrease the nano fine pores (method for using an electrically conductive ceramics support having no nano fine pore).

Incidentally, the present applicant submits, as publications where the above-mentioned publicly-known inventions are described, the following publications:

PRIOR ART DOCUMENT

Patent Document

Patent Document 1: US Unexamined Patent Application Publication No. 2007131722

Non-Patent Document

Non-Patent Document 1: Funsai-shi No56 2013 "Tokushu/Denchi no kenkyu kaihatu to kou seinou no kagi o nigiru funtai gijutu"—Kotai koubunsi-kata nenryou denchi no shokubai-so no Pt sakugen to taikyusei koujyou no tameno kaihatu no rekisi to shourai sekkei—(published on Dec. 25, 2012)

SUMMARY OF THE INVENTION

Problem to be Solved by the Invention

In order to spread the PEFC, though the core-shell catalyst is an effective catalyst to reduce an amount of Pt to be used, further improvement is required in the catalytic activity.

Particularly, the present inventors have found that the catalyst that the core-shell structure where the care part contains simple Pd and the shell part contains simple Pt on the porous support contains an electrically conductive carbon material as a structural component (hereinafter called "Pt/Pd/C catalyst" as needed) has yet a matter to be improved.

The present invention has been completed under the technical background, and is to provide an electrode catalyst (core-shell catalyst) having an excellent catalyst activity which contributes to lower the cost of the PEFC.

Further, the present invention is to provide a composition for forming a gas diffusion electrode including the electrode catalyst particles, a gas diffusion electrode, a membrane-electrode assembly (MEA), and a fuel cell stack.

Furthermore, the present invention is to provide a method for producing the electrode catalyst where the above electrode catalyst of the present invention can be easily produced.

Moreover, the present invention is to provide a composite particle which is used as a structural material of a care part of the above electrode catalyst having the core-shell structure.

Means to Solve the Problems

Among the core-shell catalysts, with respect to the Pt/Pd/C catalyst (particularly, a Pt/Pd/C catalyst where a main component of the core part is simple Pd, a main component of the shell part is simple Pt), the present inventors have intensively studied a configuration that improves more the catalytic activity.

As a result, the present inventors have found that when a ratio of the simple Pd in an analytical region near a surface measured by X-ray photoelectron spectroscopy (XPS) satisfies the following conditions, the catalytic activity can effectively be improved more, and then the present invention has been completed.

More specifically, the present invention comprises the following technical elements.

Namely, according to the present invention, there can be provided (N1) an electrode catalyst comprises:
a support containing an electrically conductive material as a structural component, and catalyst particles supported on the support,
wherein
the catalyst particle comprises a care part formed on the support, and a shell part formed so as to cover at least a part of a surface of the core part,
the core part contains simple Pd,
the shell part contains simple Pt, and
a percentage $R_C$ (atom %) of the carbon of the support and a percentage $R_{Pd}$ (atom %) of the simple Pd in an analytical region near a surface measured by X-ray photoelectron spectroscopy (XPS) satisfy the conditions of the following equation (1).

$$2.15 \leq [100 \times R_{Pd}/(R_{Pd}+R_C)] \quad (1)$$

In the present invention, XPS is measured under the following (A1) to (A5) conditions.

(A1) X-ray source: Monochromatic AlKα
(A2) Photoelectron taking out angle: θ=75° C. (referring the following FIG. 3)
(A3) Charge correction: Correcting on the basis that C1s peak energy is 284.8 eV
(A4) Analytical region: 200 μm
(A5) Chamber pressure at analyzing: about $1 \times 10^{-6}$ Pa Here, when the electrode catalyst of the present invention is measured under the above measuring conditions of XPS, the measurable depth in an analytical region near the surface is larger than the thickness of the shell part of the catalyst particle, and thus is in the lever where the core part of the catalyst particle can be measured (referring the Example 1 mentioned below, In case of the measurement of the electrode catalyst of Example 1 is about 5 nm in depth). The present inventors have confirmed that the Pd component contained in the core part, other than the Pt component contained in the shell part and the carbon component of the structural material of the support can be detected in the measuring region.

Further, in the present invention, by employing the configuration that a value of $[100 \times R_{Pd}/(R_{Pd}+R_C)]$ shown in the above equation (1) is 2.15 or more, the electrode catalyst of the present invention can exhibit an excellent catalyst activity which contributes to lower the cost of the PEFC.

The detailed reason why the electrode catalyst of the present invention has an excellent catalytic activity does not have been solved yet.

However, the present inventors consider as follows. Namely, the electrode catalyst having the structure which satisfies the equation (1) has a structure where the catalyst particles are disposed on the outer surface of an aggregate of the support (primary aggregate where primary particles of the support are aggregated, secondary aggregate where the primary aggregates are aggregated) in an amount larger than the conventional core-shell catalyst. And, also the inventors consider that, since the polymer electrolyte particles are easy to adhere on the outer surface of the aggregate, and the catalyst particles supported on the outer surface of the aggregate can be contact with the polymer electrolyte sufficiently, in the core-shell catalyst of the present invention, the catalyst particles are effectively used more in comparison with the conventional care-shell catalyst.

More specifically, for example, with respect to the outer surface of the aggregate, for example, from the viewpoint of the secondary aggregate (agglomerate), the catalyst particles are arranged on the outer surface where the polymer electrolyte is easy to be adhered in a relatively large amount in comparison with the conventional case (for example, see Non-Patent Document 1, FIG. 5).

In addition, for example, from the viewpoint of the primary aggregate (aggregate), the catalyst particles are arranged on the outer surface where the polymer electrolyte is easy to be adhered in a relatively large amount in comparison with the conventional case (for example, see Non-Patent Document 1, FIG. 5).

Furthermore, the present inventors think that, in the core-shell catalyst having the structure which satisfies the equation (1), the amount of the catalyst particles supported in the very small pores which are formed inside of the support (for example, in the very small pores formed inside the primary particle of the support, between the primary aggregates where the primary particles of the support are aggregated, and between the secondary aggregates where the primary aggregates are aggregated) is relatively small in comparison with the amount of the conventional core-shell catalyst.

Since the polymer electrolyte particle is difficult to enter into and adhere on the very small pore like this, the catalyst particle supported inside the pore cannot be contact with the polymer electrolyte and cannot act effectively as the reaction field of the electrode reaction. According to the core-shell catalyst of the present invention, the present inventors think that these catalyst particles which are not utilized effectively can be reduced sufficiently.

Further, according to the core-shell catalyst, without carrying out the trials to utilize effectively the Pt in the nano pare disclosed in the Non-Patent Document 1, namely, using the new polymer electrolyte having a low molecular chain, or using the new support which is reduced in nano pores, it is possible to utilize the catalyst particle prepared by using a relatively cheap carbon support which is generally and widely distributed from the conventional field, or by using a solid polymer electrolyte which is generally and widely distributed from the conventional field.

When the value of the $[100 \times R_{Pd}/(R_{Pd}+R_C)]$ is less than 2.15, the above excellent catalytic activity which is the effect of the present invention cannot be obtained. The present inventors think that the reason is that the catalyst particle of this case has a structure where the amount of the catalyst particle arranged in the pore formed inside of the support which is not sufficiently utilized for the electrode reaction is larger than the catalyst particles on the outer surface of the aggregate of the support particle.

According to the present invention, when calculating the percentage $R_C$ (atom %) of the carbon of the support and the percentage $R_{Pd}$ (atom %) of the simple Pd in an analytical region near a surface measured by XPS, the numerical value are calculated so that the sum of the three components including the percentages of the two components and the percentage $R_{Pt}$ of simple Pt (atom %) obtained in the same analytical region is 100%.

The equation (1) is introduced on the basis of the technical idea that many of the particles having the simple Pd as a main component (preferably particles of the simple Pd) which forms the core part are arranged in the pore formed inside the support rather than the outer surface of the aggregate of the support particles is the essential requisite for arranging the catalyst particle having the core-shell structure which is prepared by forming the shell part on the core part on the outer surface of the aggregate of the support particles rather than the inside of the pore formed inside the support.

According to the present invention, the average thickness of the shell part can be changed within the range where the effects of the present invention can be obtained. Therefore, the equation (1) aims to watch the percentage of the catalyst particles supported on the outer surface of the aggregate of the support particles among the total catalyst particles supported on the support while reducing sufficiently the influence of the change of the average thickness of the shell part, and thus the percentage $R_{Pd}$ (atom %) of the Pd contained in the core part is focused.

In the description, when explaining the structure of the electrode catalyst, there is represented by "structure (main structural material) of the catalyst particle supported on the support/structure (main structural material) of the support having electric conductivity". More specifically, there is represented by "structure of the shell part I/structure of the core part/structure of the support".

For example, in case that the structure on the electrode catalyst has the structure "the shell part of Pt, the core part of Pd, the support of the electrically conductive carbon", the structure is represented by "Pt/Pd/C".

Further, in the electrode catalyst of the present invention, (N2) it is preferable that the $R_{Pt}$ and the $R_{Pd}$ further satisfy the following condition of the equation (2).

$$2.15 \leq [100 \times R_{Pd}/(R_{Pd}+R_C)] \leq 4.50 \qquad (2)$$

When the value of the $[100 \times R_{Pd}/(R_{Pd}+R_C)]$ is 4.50 or less, there tends largely that the above excellent catalytic activity of the present invention can be obtained more easily. The reason is not yet clearly confirmed, but the present inventors think that, in this case, there tends largely that the catalyst particles are not arranged on the outer surface of the aggregate of the support particle in a highly dispersed state.

Further, from the viewpoint that the effects of the present invention can be obtained more reliably, the value of the $[100 \times R_{Pd}/(R_{Pd}+R_C)]$ of the equation (1) and the equation (2) is preferably 3.00 to 4.50, further preferably 3.40 to 4.50.

Furthermore, in the electrode catalyst of the present invention, from the viewpoint that the excellent catalyst activity can be obtained more reliably, (N3) it is preferable that the core part comprises the simple Pd, and the shell part comprises the simple $P_t$. In this case, within the range where the catalyst particle exhibits the excellent catalytic activity, the core part may contain a Pd oxide, and the shell part may contain a Pt oxide.

As mentioned above, according to the present invention, though the average thickness of the shell part can be changed within the range where the effects of the present invention can be obtained, in order to exhibit excellent catalytic activity, it is preferable that the average thickness of the shell part is thin enough so as to be a level to exhibit the so-called under layer effect (ligand effect) of the care part.

Namely the average thickness of the shell part of the electrode catalyst of the resent invention is preferably 0.2 to 1.0 nm.

In the present invention, when the average thickness of the shell part is 0.2 nm or more, there tends largely that the core part is sufficiently covered by the shell part becomes large. Thereby the sufficient catalytic activity as the core-shell catalyst can be easily obtained. And it is preferable that durability and reliability can also obtained sufficiently.

Further, when the average thickness of the shell part is 1.0 nm or less, it is possible to easily contribute to the low cost (low platinum content) of the PEFC. In this case, it is easier to obtain the so-called under layer effect (ligand effect) of the core part, and thus it is preferable to obtain more easily the catalytic activity beyond the conventional Pt/C catalyst.

From the viewpoint that the above effects can be obtained more reliably, the average thickness of the shell part of the electrode catalyst of the present invention is preferably 0.2 to 0.9 nm, more preferably 0.2 to 0.7 nm, further preferably 0.2 to 0.5 nm.

For example, in case that the shell layer is a layer composed of Pt, when the average thickness is within the above range, the layer can be made in a thickness of 4 Pt atomic layers or less, preferably 3 atomic layers or less, more preferably 2 atomic layers or less. The reason is that since the metal bond radius of Pt is 0.139 nm, the average thickness of one Pt atomic layer is around 0.21 nm to 0.23 nm. From other reason, when the lattice coefficient (K) of simple Pt is to be K=0.39231 nm, the plane distance of platinum ($d_{111}$) is 0.2265 nm ($=k/\sqrt{3}$).

Here, the average thickness of the shell part can be calculated by evaluating the average particle size of the catalyst particle and the average particle size of the core part by the SEM image (Scanning Electron Microscopy image) or the TEM image (Transmission Electron Microscopy image). Namely the average thickness of the shell part can be obtained from the difference of the average particle size of the catalyst particle and the average particle size of the core part.

Alternatively, the average thickness of the shell part can also be obtained, for example, by measuring the average particle size of the catalyst particle and the average particle size of the core part by using the TEM-EDX (Transmission Electron Microscopy-Energy Dispersive X-ray Spectroscopy) in the particle size direction of the catalyst particle, or by using the TEM-EDX (Transmission Electron Microscopy-Energy Dispersive X-ray Spectroscopy) according to the line analysis.

Further, in the electrode catalyst of the present invention, it is preferable that the catalyst particle has an average value of the crystallite size measured by the powder X-ray diffraction (XRD) a 3 to 16.0 nm.

When the average value of the crystallite size is 3 nm or more, it is easier to form the particle as the core on the support, and it is preferable to form more easily the catalyst particle on the support so as to satisfy the requirement of the equation (1).

In addition, when the average value of the crystallite size is 16.0 nm or less, it is easier to form the particle as the core on the support in the highly dispersed state, and it is preferable to form more easily the catalyst particle on the support so as to satisfy the requirement of the equation (1).

From the viewpoint that the above effects can be obtained more reliably, the average crystallite size measured by the powder X-ray diffraction (XRD) of the catalyst particle of the electrode catalyst of the present invention is more preferably 3.0 to 6.0 nm, further preferably 3.4 to 5.5 nm.

In the present invention, when the shell part of Pt of the catalyst particle is composed of one or two layers of the Pt atomic layer, the peak of the Pt (111) plane cannot be observed by the XRD, and thus, the average value calculated from the peak of the Pd (111) pane of the core part is deemed to be the average value of the crystallite size of the catalyst particle.

Further, in the present invention, the Pt support rate of the catalyst particle is preferably 0.6 to 33.0 wt %.

When the Pt support rate is 0.6 wt % or more, the sufficient catalytic activity can be more easily obtained. Further, in this case, it is easier to prevent the average thickness of the shell part from too thin, and thus the surface of the core part can be covered more easily with the shell part sufficiently. Therefore, in this case, it is easier to prevent from elution of the structural material of the core part of the catalyst particle, and thus the care-shell structure can be maintained more easily.

Further, when the Pt support rate is 33.0 wt % or less, it is easier to form the catalyst particle having the core-shell structure on the support in the highly dispersed state. Further, in this case, it is easier to prevent the average thickness of the shell part from too thick. Therefore, it is easier to obtain the so-called under layer effect (ligand effect) of the core part of the catalyst particle, and thus the catalytic activity beyond the conventional Pt/C catalyst can be obtained more easily.

From the viewpoint that the above effects can be obtained more reliably, the catalyst particle of the electrode catalyst according to the present invention has more preferably a Pt support rate of 15.0 to 19.0 wt %.

Further, in the present invention, the Pd support rate of the catalyst particle is preferably 4.7 to 47.0 wt %.

When the Pd support rate is 4.7 wt % or more, it is easy to increase the number of the particles which constitute the core part formed on the support sufficiently, and then it is easy to increase the number of the catalyst particles formed on the support sufficiently, and thus the sufficient catalytic activity can be mare easily obtained.

Further, when the Pd support rate is 47.0 wt % or less, it is easier to support the particle which constitutes the core part in the highly dispersed state. As a result, it is easier to form the catalyst particle having the core-shell structure on the support in the highly dispersed state.

From the viewpoint that the above effects can be obtained more reliably, the catalyst particle of the electrode catalyst according to the present invention has more preferably a Pd support rate of 24.0 to 27.0 wt %.

Furthermore, in the present invention, a total support rate of the noble metals of Pt and Pd of the catalyst particle is preferably 5.6 to 66.5 wt %.

When the total support rate of the noble metals of Pt and Pd is 5.6 wt % or more, the sufficient catalytic activity can be more easily obtained.

When the total support rate of the noble metals of Pt and Pd is 66.5 wt % or less, it is easier to form the catalyst particle having the core-shell structure on the support in the highly dispersed state.

From the viewpoint that the above effects can be obtained more reliably, the catalyst particle of the electrode catalyst according to the present invention has more preferably a total support rate of the noble metals of Pt and Pd of 39.0 to 46.0 wt %.

As the Pt support rate and the Pd support rate, values measured by ICP emission spectrometry are used.

Furthermore, the present invention can provide (N4) a composition for forming gas diffusion electrode which comprises the electrode catalyst according to any one of the aforementioned (N1) to (N3).

Since the composition for forming gas diffusion electrode of the present invention includes the electrode catalyst of the present invention, it is easy to produce a gas diffusion electrode which has an excellent catalyst activity (polarization property) to contribute to the low cost of the PEFC.

Further, the present invention can provide (N5) a gas diffusion electrode which comprises the electrode catalyst according to any one of the aforementioned (N1) to (N3), or which is formed by using the composition for forming gas diffusion electrode which comprises the electrode catalyst according to the aforementioned (N4).

The gas diffusion electrode includes the electrode catalyst of the present invention. Or the gas diffusion electrode of the present invention is formed by using the composition for forming gas diffusion electrode of the present invention. Therefore, it is easy to produce the structure which has an excellent catalyst activity (polarization property) to contribute to the low cost of the PEFC.

Furthermore, the present invention can provide (N6) a membrane-electrode assembly (MEA) comprising the gas diffusion electrode according to the aforementioned (N5).

Since the membrane-electrode assembly (MEA) of the present invention includes the gas diffusion electrode of the present invention, it is easy to produce the structure which has battery properties to contribute to the low cost of the PEFC.

Further, the present invention can provide (N7) a fuel cell stack comprising the membrane-electrode assembly (MEA) according to the aforementioned (N6).

Since the fuel cell stack of the present invention includes the membrane-electrode assembly (MEA) of the present invention, it is easy to produce the structure which has battery properties to contribute to the low cost of the PEFC.

Furthermore, the present invention can provide (N8) a method for producing an electrode catalyst comprises:

a core part forming step for forming a Pd/C particle where core particles containing simple Pd are supported on a support containing an electrically conductive carbon material as a structural component, and a shell part forming step for forming a shell part containing simple Pt so as to cover at least a part of a surface of the core part of the Pd/C particle obtained through the core part forming step, wherein the core part forming step and the shell part forming step are regulated so that a percentage $R_C$ (atom %) of the carbon of the support and a percentage $R_{Pd}$ (atom %) of the simple Pd in an analytical region near a surface measured by X-ray photoelectron spectroscopy (XPS) satisfy the conditions of the following equation (I).

$$2.15 \leq [100 \times R_{Pd}/(R_{Pd}+R_C)] \quad (I)$$

According to the method for producing an electrode catalyst, it is possible to obtain the electrode catalyst of the present invention more easily.

Further, in the method for producing an electrode catalyst, it is preferable that (N9) the production conditions in the core part forming step and the shell part forming step are regulated so that the $R_{Pt}$ and the $R_{Pd}$ satisfy the conditions of the following equation (II).

$$2.15 \leq [100 \times R_{Pd}/(R_{Pd}+R_C)] \leq 4.50 \quad (II)$$

In this case, it is possible to obtain the electrode catalyst of the present invention more easily.

Here, according to the present invention, when calculating the percentage $R_C$ (atom %) and the percentage RN (atom %) in the equation (I) and the equation (II), the numerical value are calculated so that the sum of the three components including the percentages of the two components and the percentage $R_{Pt}$ (atom %) of simple Pt obtained in the same analytical region is 100%.

Further, in the method for producing an electrode catalyst, it is preferable that (N10) the production condition in the core part forming step is regulated so that a percentage $RO_C$ (atom %) of the carbon of the support and a percentage $RO_{Pd}$ (atom %) of the simple Pd in an analytical region near a surface measured by X-ray photoelectron spectroscopy (XPS) with respect to the Pd/C particle obtained through the core part forming step satisfy the conditions of the following equation (III).

$$3.00 \leq [100 \times RO_{Pd}/(RO_{Pd}+RO_C)] \qquad (III)$$

When the $RO_{Pd}$ is 3.00 atom % or more, it is possible to obtain the electrode catalyst of the present invention more easily and reliably.

The percentage $RO_{Pd}$ of the simple Pd in an analytical region near a surface when the Pd/C particle is measured by XPS is the numerical value which is calculated so that the sum of the two components of the percentage of the simple Pd and the percentage $RO_C$ (atom %) of the carbon of the support obtained from the same analytical region is 100%.

Further, in the method for producing an electrode catalyst, it is preferable that (N11) the production condition in the core part forming step is regulated so that the $RO_C$ and the $RO_{Pd}$ satisfy the conditions of the following equation (IV).

$$3.00 \leq [100 \times RO_{Pd}/(RO_{Pd}+RO_C)] \leq 6.00 \qquad (IV)$$

When the $RO_{Pd}$ is 6.00 atom % or more, it is possible to obtain the electrode catalyst of the present invention more easily and reliably.

Further, according to the present invention, it is preferable that the average value of the crystallite size obtained by measuring with the powder X-rat diffraction (XRD) the core particle which is obtained through the core part forming step and constitutes the Pd/C particle is regulated to 2.0 to 15 nm, more preferably regulated to 2.0 to 4.5 nm. When using the particle to be the core part having the above particle size, it is possible to obtain the catalyst particle which satisfies the aforementioned average value of the condition of crystallite size (3 to 16.0 nm) measured by the powder X-rat diffraction (XRD) more reliably.

Further, the present invention can provide (N12) a composite particle which is used as a structural component of a core part which configures an electrode catalyst comprising a support containing an electrically conductive material as a structural component, and catalyst particles supported on the support, wherein the catalyst particle comprises a core part formed on the support, and a shell part formed so as to cover at least a part of a surface of the core part, the core part contains simple Pd, and the shell part contains simple Pt, and comprises:

a support containing an electrically conductive material as a structural component, and particles containing simple Pd supported on the support, and a percentage $RO_C$ (atom %) of the carbon of the support and a percentage $RO_{Pd}$ (atom %) of the simple Pd in an analytical region near a surface measured by X-ray photoelectron spectroscopy (XPS) satisfy the conditions of the following equation (C1).

$$3.00 \leq [100 \times RO_{Pd}/(RO_{Pd}+RO_C)] \qquad (C1)$$

The composite particle of the present invention is a structure material of the care part of the electrode catalyst of the present invention having the care-shell structure.

When using the composite particle having the $RO_{Pd}$ of 3.00 atom % or more, it is possible to obtain the electrode catalyst of the present invention more easily and reliably.

Furthermore, in the composite particle of the present invention, (N13) the $RO_C$ and the $RO_{Pd}$ satisfy the conditions of the following equation (C2).

$$3.00 \leq [100 \times RO_{Pd}/(RO_{Pd}+RO_C)] \leq 6.00 \qquad (C2)$$

When using the composite particle having the $RO_{Pd}$ of 6.00 atom % or less, it is possible to obtain the electrode catalyst of the present invention more easily and reliably.

Effects of the Invention

According to the present invention, it is possible to provide the electrode catalyst which has an excellent catalyst activity to contribute to the low cost of the PEFC.

Further, according to the present invention, it is possible to provide the composition for forming gas diffusion electrode, the gas diffusion electrode, the membrane-electrode assembly (MEA), and the fuel cell stack, which contain the above electrode catalyst.

Furthermore, according to the present invention, it is possible to provide the method for producing the aforementioned electrode catalyst more easily.

Further, according to the present invention, it is possible to provide the composite particle which is used as the structural material of the core part of the above electrode catalyst having the core-shell structure.

MODE FOR CARRYING OUT THE INVENTION

Preferable embodiments of the present invention are described in detail hereunder with reference to the drawings when necessary.

<Electrode Catalyst>

Figure 1:
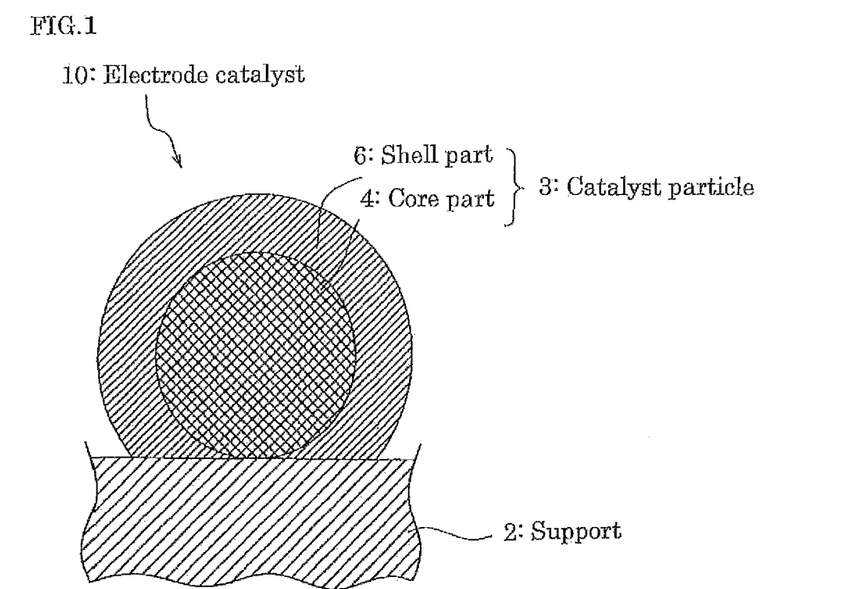
FIG. 1 is a schematic sectional view showing a preferred embodiment of the electrode catalyst of the present invention (core-shell catalyst).
Figure 2:
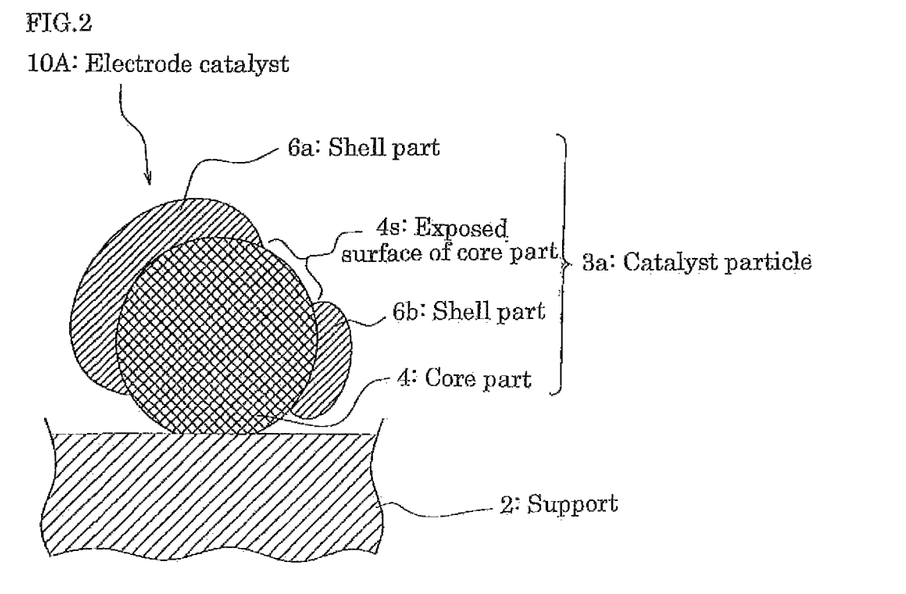
FIG. 2 is a schematic sectional view showing another preferred embodiment of the electrode catalyst of the present invention (core-shell catalyst).

FIG. 1 is a schematic cross-sectional view showing a preferable embodiment of an electrode catalyst (core-shell catalyst) of the present invention. And FIG. 2 is a schematic sectional view showing another preferred embodiment of the electrode catalyst of the present invention (core-shell catalyst).

Further as shown in FIG. 1, an electrode catalyst 10 of the present invention includes a support 2, and catalyst particles 3 supported on the support 2 and having a so-called (core-shell structure).

Further, the catalyst particle 3 has a so-called "core-shell structure" where a core part 4 formed on the support 2, and a shell part 6 formed on the core part 4.

Namely, the electrode catalyst 10 has a structure that the core part 4 is supported on the support 2, and the care part 4 is covered with the shell part 6.

In addition, the elements of the components (chemical composition) and the elements of the components (chemical composition) of the shell part 6 are different.

According to the present invention, in the electrode catalyst, the shell part may be formed on at least a part of the surface of the core part.

For example, from the viewpoint to obtain the effects of the present invention more reliably, it is preferred that the electrode catalyst 10 be in a state where the almost of all range of the surface of the core part 4 is covered with the shell part 7, as shown in FIG. 1.

Further, as shown in FIG. 2, the electrode catalyst 10A may also be in a state where a part of the surface of the core part 4 is covered, and the rest part of the surface at the core part 4 is partially exposed (e.g. a state where a part 4s of the surface of the core part 4 shown in FIG. 2 being exposed), within the scope where the effects of the present invention can be obtained. In other words, as is the case with the electrode catalyst 10A shown in FIG. 2, the shell part 6a and the shell part 6b may be partially formed on a part of the surface of the core part 4.

In addition, the electrode catalyst of the present invention may be a state where the electrode catalyst 10 shown in FIG. 1 and the electrode catalyst 10A shown in FIG. 2 coexist in a mixed manner.

Further, as shown in FIG. 2, within the scope where the effects of the present invention can be obtained, the electrode catalyst of the present invention may be a state where the shell part 6a and the shell part 6b coexist in a mixed manner with respect to an identical core part 4, within the scope where the effects of the present invention can be obtained.

Furthermore, within the scope where the effects of the present invention can be obtained, the electrode catalyst may also be in a state where "particles only composed of the core part 4 that are not covered by the shell parts (shell parts 6, 6a, 6b)" are supported on the support 2 (not shown), in addition to at least one of the above electrode catalyst 10 and the electrode catalyst 10A.

Furthermore, within the scope where the effects of the present invention can be obtained, the electrode catalyst may also be in a state where "particles only composed of the constituent element of the shell parts (shell parts 6, 6a, 6b)" are supported without being in contact with the core part 4 (not shown), in addition to at least one of the electrode catalyst 10 and the electrode catalyst 10A.

Furthermore, within the scope where the effects of the present invention can be obtained, the electrode catalyst 1 may also be in a state where "particles only composed of the are part 4 that are not covered by the shell parts (shell parts 6, 6a, 6b)" and "particles only composed of the constituent element of the shell parts (shell parts 6, 6a, 6b)" are individually supported, in addition to at least one of the electrode catalyst 10 and the electrode catalyst 10A.

The average thickness of the shell part 6 is preferably 0.2 to 1.0 nm as mentioned above. Further, the average thickness of the shell part 6 is preferably 0.2 to 0.9 nm, more preferably 0.2 to 0.7 nm, further preferably 0.2 to 0.5 nm.

For example, in case that the shell layer is a layer composed of Pt, when the average thickness is within the above range, the layer can be made in a thickness of 4 Pt atomic layers or less, preferably 3 atomic layers or less, more preferably 2 atomic layers or less.

For example, in order to reduce the amount to be used of Pt which is the structural material of the shell part 6, the shell part is preferably a layer of one Pt atom (Pt atomic layer).

There are no particular restrictions on the support 2, as long as such being capable of supporting the complexes composed of the core parts 4 and the shell part 6, and has a large surface area.

Moreover, it is preferred that the support 2 be that exhibiting a favorable dispersibility and a superior electrical conductivity in a composition used to form a gas diffusion electrode having the electrode catalyst 10 (or 10A).

The support 2 may be appropriately selected from carbon-based materials such as glassy carbon (GC), fine carbon, carbon black, black lead, carbon fiber, activated carbon, ground product of activated carbon, carbon nanofiber and carbon nanotube; and glass-based or ceramic-based materials such as oxides.

Among these materials, carbon-based materials are preferred in terms of their adsorptivities with respect to the care part 4 and in terms of a BET specific surface area of the support 2.

Further, as a carbon-based material, an electrically conductive carbon is preferred, and particularly, an electrically conductive carbon black is preferred as an electrically conductive carbon.

Examples of such electrically conductive carbon black include products by the names of "Ketjenblack EC300 J," "Ketjenblack EC600" and "Carbon EPC" (produced by Lion Corporation).

The simple Pd is contained in the core part 4. From the viewpoint to obtain the effects of the present invention more reliably, and from the viewpoint to produce easily, etc., the core part 4 is preferably made so as to have the simple Pd as a main component (50 wt % or more), and more preferably made of the simple Pd.

The simple Pt is contained in the shell part 6. From the viewpoint to obtain the effects of the present invention more reliably, and from the viewpoint to produce easily, etc., the shell part 6 is preferably made so as to have the simple Pt as a main component (50 wt % or more), and more preferably made of the simple Pt.

From the viewpoint to obtain the effects of the present invention more reliably, it is preferred that the electrode catalyst 10 and the electrode catalyst 10A satisfy the following condition.

Namely, as mentioned above, it is preferable that the electrode catalyst 10 and the electrode catalyst 10A have an average value of the crystallite size measured by the powder X-ray diffraction (XRD) of 3 to 16.0 nm.

Further, as mentioned above, it is preferable that the electrode catalyst 10 and the electrode catalyst 10A have the Pt support rate of 0.6 to 33.0 wt %, and the Pd support rate of 4.7 to 47.0 wt %.

Further, in the electrode catalyst 10 and the electrode catalyst 10A, the percentage $R_C$ (atom %) of the carbon of the support and the percentage $R_{Pd}$ (atom %) of the simple Pd in an analytical region near a surface measured by X-ray photoelectron spectroscopy (XPS) satisfy the conditions of the following equation (1), preferably satisfy the conditions of the following equation (2).

$$2.15 \leq [100 \times R_{Pd}/(R_{Pd}+R_C)] \tag{1}$$

$$2.15 \leq [100 \times R_{Pd}/(R_{Pd}+R_C)] \leq 4.50 \tag{2}$$

In the present invention, the X-ray photoelectron spectroscopy (XPS) is measured under the following (A1) to (A5) conditions.

Figure 3:
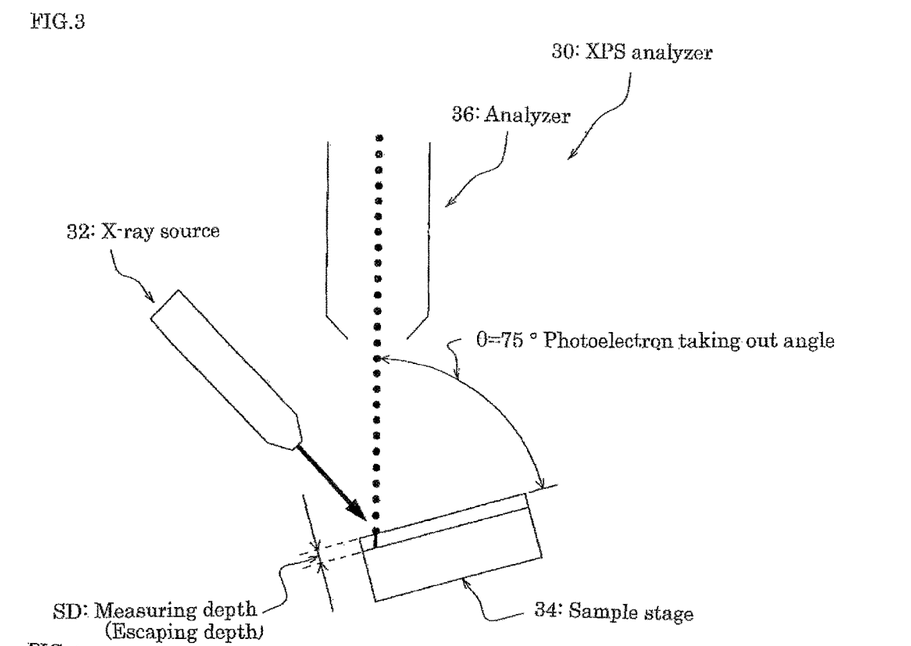
FIG. 3 is a schematic diagram showing a brief structure of the XPS machine to explain the analytical conditions of the X-ray photoelectron spectroscopy (XPS) in the present invention.

(A1) X-ray source: Monochromatic AlKα
(A2) Photoelectron taking out angle: θ=75° C.
(A3) Charge correction: Correcting on the basis that C1s peak energy is 284.8 eV
(A4) Analytical region: 200 μm
(A5) Chamber pressure at analyzing: about $1 \times 10^{-6}$ Pa Here, the photoelectron taking out angle θ of (A2) is an angle θ, as shown in FIG. 3, when a X-ray emitted from an X-ray source 32 is irradiated to a sample set on a sample stage 34, and a photoelectron emitted from the sample is received by a spectroscope 36. Namely, the photoelectron taking out angle θ corresponds to an angle of the light receiving axis of the spectroscope 36 to the surface of the layer of the sample on the sample stage 34.

<Preparation Method of the Electrode Catalyst>

The preparation method of the electrode catalyst 10 (or 10A) include the "core part forming step" where the Pd/C particles that the core particles containing the simple Pd (particle which is the precursor of the core part) are supported on the support containing the electrically conductive carbon material as the structural component are formed, and the "shell part forming step" where the shell part 6 (6a, 6b) containing the simple Pt is formed on at least one of the surface of the core particles of the Pd/C particles (the composite particle of the present invention) obtained by the core part forming step (particle which is the precursor of the core part).

The electrode catalyst 10 (or 10A) is produced by supporting the catalyst particles 3 (3a) of the catalyst component of the electrode catalyst, that is, the core part 4, the shell part 6 (6a, 6b) on the support 2 in this order.

The preparation method of the electrode catalyst 10 (10A) is not particularly limited as long as the method allows the catalyst particles 3 (3a) of the catalyst component to be supported on the support 2.

Examples of the production method of the electrode catalyst precursor include an impregnation method where a solution containing the catalyst component is brought into contact with the support 2 to impregnate the support 2 with the catalyst components; a liquid phase reduction method where a reductant is put into a solution containing the catalyst component; an electrochemical deposition method such as under-potential deposition (UPD); a chemical reduction method; a reductive deposition method using adsorption hydrogen; a surface leaching method of alloy catalyst; immersion plating; a displacement plating method; a sputtering method; and a vacuum evaporation method.

Provided that, the production conditions of the core part forming step and the shell part forming step are so regulated that the percentage $R_C$ (atom %) of the carbon of the support and the percentage $R_{Pd}$ (atom %) of the simple Pd in an analytical region near a surface measured by X-ray photoelectron spectroscopy (XPS) satisfy the conditions of the following equation (I), preferably satisfy the conditions of the following equation (II).

$$2.15 \leq [100 \times R_{Pd}/(R_{Pd}+R_C)] \tag{I}$$

$$2.15 \leq [100 \times R_{Pd}/(R_{Pd}+R_C)] \leq 4.50 \tag{II}$$

Furthermore, it is preferable that the production condition in the core part forming step is regulated so that the percentage $RO_{Pd}$ of the simple Pd in an analytical region near a surface measured by X-ray photoelectron spectroscopy (XPS) with respect to the Pd/C particle obtained through the "core part forming step" (particle corresponding to the composite particle of the present invention) satisfies the conditions of the following equation (III), more preferably satisfies the conditions of the following equation (IV).

$$3.00 \leq [100 \times RO_{Pd}/(RO_{Pd}+RO_C)] \tag{III}$$

$$3.00 \leq [100 \times RO_{Pd}/(RO_{PD}+RO_C)] \leq 6.00 \tag{IV}$$

The conditions of the equation (III) are the same as the conditions of the aforementioned equation (C1), and the conditions of the equation (IV) are the same as the conditions of the aforementioned equation (C2).

When the $RO_{Pd}$ is 3.00 atom % or more in the care part forming step, the electrode catalyst obtained through the core part forming step can easily satisfy the conditions shown by the equations (I) to (II).

Further, in the core part forming step, the average value of the crystallite size measured by the powder X-ray diffraction (XRD) of the core particle which composes the Pd/C particle obtained through the core part forming step is preferably regulated to 2 to 15 nm.

By using the particle having the size within the above size as the particle for the core part, the catalyst particle which satisfies the condition of the average value of the crystallite size measured by the powder X-ray diffraction (XRD) (preferably 3 to 16.0 nm) can be obtained reliably.

As a method for preparing the electrode catalyst 10 and the electrode catalyst 10A so as to satisfy the preferred conditions such as the conditions shown by the above equations (I) to (II), the conditions shown by regulating the $RO_{Pd}$ of the Pd/C particle in the care part forming step according to the above equations (III) to (IV), the condition where the average value of crystallite size measured by the powder X-ray diffraction O(RD) is 2 to 15 nm, far example, there is a method where the chemical formulation and structure of the resulting product (catalyst) are analyzed by various known analytical techniques, the obtained analyzed data are fed back to the production process, and then the raw materials to be selected, the blend ratios of the raw materials, the synthetic reaction to be selected, the reaction conditions of the selected synthetic reaction, and the like are regulated and varied, and the like.

<Structure of Fuel Cell>

Figure 4:
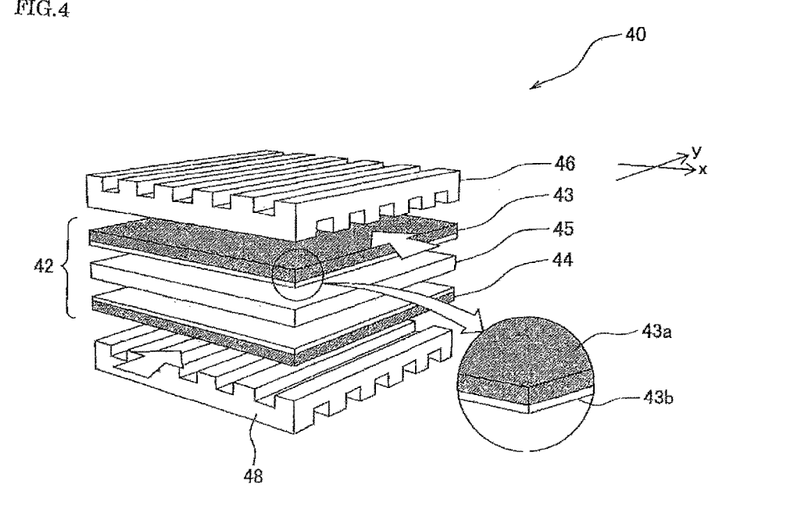
FIG. 4 is a schematic diagram showing a preferred embodiment of a fuel cell stack of the present invention.

FIG. 4 is a schematic view showing preferable embodiments of a composition for forming gas diffusion electrode containing the electrode catalyst of the present invention; a gas diffusion electrode produced using such composition for forming gas diffusion electrode; a membrane-electrode assembly (Membrane Electrode Assembly: hereinafter referred to as "MEA" as needed) having such gas diffusion electrode; and a fuel cell stack having such MEA.

The fuel cell stack 40 shown in FIG. 4 has a structure where the MEA 42 is one-unit cell, and the multiple layers of such one-unit cells are stacked.

Further, the fuel cell stack 40 has the MEA 42 that is equipped with an anode 43 of the gas diffusion electrode, a cathode 44 of the gas diffusion electrode, and an electrolyte membrane 45 provided between these electrodes.

Furthermore, the fuel cell stack 40 has a structure where the MEA 42 is sandwiched between a separator 46 and a separator 48.

Described hereunder are the composition for forming gas diffusion electrode, the anode 43 and cathode 44 of the gas diffusion electrode, the MEA 42, all of which serve as members of the fuel cell stack 40 containing the electrode catalyst of the present invention.

<Composition for Forming Gas Diffusion Electrode>

The electrode catalyst of the present invention can be used as a so-called catalyst ink component and serve as the composition for forming gas diffusion electrode in the present invention.

One feature of the composition for forming gas diffusion electrode of the present invention is that this composition contains the electrode catalyst of the present invention.

The main components of the composition far forming gas diffusion electrode are the aforementioned electrode catalyst and an ionomer solution. The composition of the ionomer solution is not particularly limited. For example, the ionomer solution may contain a polyelectrolyte exhibiting a hydrogen ion conductivity, water and an alcohol.

The polyelectrolyte contained in the ionomer solution is not particularly limited. Examples of such polyelectrolyte include known perfluorocarbon resins having sulfonate group, carboxylic acid group. As an easily obtainable hydrogen ion-conductive polyelectrolyte, there can be listed, for example, Nafion (registered trademark of Du Pont), ACIPLEX (registered trademark of Asahi Kasei Chemical Corporation) and Flemion (registered trademark of ASAHI GLASS Co., Ltd).

The composition for forming gas diffusion electrode can be produced by mixing, crushing and stirring the electrode catalyst and the ionomer solution.

The composition for forming gas diffusion electrode may be prepared using crushing and mixing machines such as a ball mill and/or an ultrasonic disperser. A crushing and a stirring condition at the time of operating a crushing and mixing machine can be appropriately determined in accordance with the mode of the composition for forming gas diffusion electrode.

The composition of each of the electrode catalyst, water, alcohol and hydrogen ion-conductive polyelectrolyte that are contained in the composition for forming gas diffusion electrode may be set so as to be that capable of achieving a favorable dispersion state of the electrode catalyst, allowing the electrode catalyst to be distributed throughout an entire catalyst layer of the gas diffusion electrode and improving the power generation performance of the fuel cell.

<Gas Diffusion Electrode>

The anode 43 of the gas diffusion electrode has a structure having a gas diffusion layer 43a and a catalyst layer 43b which is provided on the surface of the gas diffusion layer 43a at an electrolyte membrane 45 side.

The cathode 44 has, in the same manner as the anode 43, a structure having a gas diffusion layer (not shown) and a catalyst layer (not shown) which is provided on the surface of the gas diffusion layer at an electrolyte membrane 45 side.

The electrode catalyst of the present invention may be contained in the catalyst layer of at least one of the anode 43 and the cathode 44.

The gas diffusion electrode can be used as an anode, and also can be used as a cathode.

(Electrode Catalyst Layer)

In the case of the anode 43, the catalyst layer 43b serves as a layer where a reaction of dissociating a hydrogen gas sent from the gas diffusion layer 43a into hydrogen ions takes place.

Further, in the case of the cathode 44, the catalyst layer (not shown) serves as a layer where a reaction of bonding an air (oxygen gas) sent from the gas diffusion layer (not shown) and the hydrogen ions that have traveled from the anode 43 through the electrolyte membrane 45 takes place.

At least one of the catalyst layer 43b of the anode 43 and the catalyst later (not shown) of the cathode 44 may be formed by using the aforementioned composition for forming a gas diffusion electrode.

(Gas Diffusion Layer)

The gas diffusion layer equipped to the anode 43 of the gas diffusion electrode and the cathode 44 of the gas diffusion electrode serves as a layer provided to diffuse to each of the corresponding catalyst layers the hydrogen gas introduced from outside the fuel cell stack 40 into gas flow passages that are formed between the separator 46 and the anode 43, and the air (oxygen gas) introduced into gas passages that are formed between the separator 48 and the cathode 44.

In addition, the gas diffusion layer plays a role of supporting the catalyst layer so as to immobilize the catalyst layer to the surface of the gas diffusion electrode.

The gas diffusion layer has a function of favorably passing the hydrogen gas or air (oxygen gas) and then allowing such hydrogen gas or air to arrive at the catalyst layer. For this reason, it is preferred that the gas diffusion layer have a water-repellent property. For example, the gas diffusion layer has a water repellent component such as polyethylene terephthalate (PTFE).

There are no particular restrictions on a material that can be used in the gas diffusion layer, and there can be employed a material known to be used in a gas diffusion layer of a fuel cell electrode. For example, there may be used a carbon paper; or a material made of a carbon paper as a main raw material and an auxiliary raw material applied to the carbon paper as the main raw material, such auxiliary raw material being composed of a carbon powder as an optional ingredient, an ion-exchange water also as an optional ingredient and a polyethylene terephthalate dispersion as a binder.

The anode 43 of the gas diffusion electrode and the cathode 44 of the gas diffusion electrode may have an intermediate layer (not shown) between the gas diffusion layer and the catalyst layer.

(Production Method of Gas Diffusion Electrode)

A production method of the gas diffusion electrode is now explained. The gas diffusion electrode of the present invention may be produced so that the electrode catalyst of the present invention is a structural component of the catalyst layer, and the method of production is not particularly limited, and any known production method can be employed.

For example, the gas diffusion electrode may be produced through a step of applying the composition for forming gas diffusion electrode which contains the electrode catalyst, the hydrogen ion-conductive polyelectrolyte and the ionomer to the gas diffusion layer, and a step of drying such gas diffusion layer to which the composition for forming gas diffusion electrode has been applied to form the catalyst layer.

<Membrane-Electrode Assembly (MEA)>

The MEA 42 shown in FIG. 4 has a structure having the anode 43, the cathode 44 and the electrolyte membrane 45.

The MEA 42 has a structure where at least one of the anode and the cathode has the gas diffusion electrode containing the electrode catalyst of the present invention.

The MEA 42 can be produced by stacking the anode 43, the electrolyte 300, and the cathode 44 in this order, and then bonded under pressure.

<Fuel Cell Stack>

When one-unit cell (single cell) has a structure where the separator 46 is disposed on the outer side of the anode 43 of the MEA 42 and the separator 48 is disposed on the outer side of the cathode 44, the fuel call stack 40 shown in FIG. 4 is composed of only one-unit cell (single cell) or an integrated structure of two or more (not shown).

The fuel call system is completed by attaching peripheral devices to the fuel cell stack 40 and assembling them.

EXAMPLE

In the following, the present invention is more specifically explained by referring working examples, but the present invention is not limited to the following working examples.

(I) Prevision of Electrode Catalyst for Examples and Comparative Examples

Example 1

<Production of Electrode Catalyst>
["Pt/Pd/C" Powder where the Shell Part of Pt is Formed on Pd/C]

A "Pt/Pd/C" powder {Pt support rate: 16.8 wt % (result of ICO analysis), Trade name "NE-H10217-BD", available from N.E.CHEMNAT} where the shell part of Pt is formed on Pd of the particle of the following "Pd/C" powder was prepared as an electrode catalyst of Example 1.

This Pt/Pd/C powder was prepared by using the following Pd/C powder, forming a coating film of Cu on the surface of the core particle of Pd of Pd/C by means of a general Cu-UPD method, and then using potassium chloroplatinate to carry out the galvanic substitution reaction of Cu and Pt.

[Core Particle Supporting Carbon "Pd/C" Powder (Corresponding to Example of the Composite Particle of the Present Invention]

A "Pd/C" powder {Pd support rate: 30 wt %, Trade name "NE-H00230-D", available from N.E.CHEMNAT} where the core particles of the Pd are supported on a carbon black powder was prepared. This "Pd/C" powder is prepared by regulating the percentage $RO_{Pd}$ of the simple Pd in an analytical region near a surface measured by X-ray photoelectron spectroscopy (XPS) to 3.0 atom % or more.

The Pd/C powder was obtained by preparing a mixed solution of a commercially available carbon black powder (specific surface area of 750 to 800 m$^2$/g), sodium tetrachloropalladate(II) and water, and adding a reducing agent thereto, and then reducing palladium ion in the solution so that the above RO is 3.0 atom % or more.

<Surface Analysis of Electrode Catalyst by X-Ray Photoelectron Spectroscopy (XPS)>

With respect to the electrode catalyst of Example 1, the surface analysis was conducted by the XPS to measure the percentage $R_C$ (atom %) of the carbon of the support, the percentage RN (atom %) of the simple Pd, and the percentage $R_{Pt}$ (atom %) of simple Pt.

Specifically, the analysis was conducted by using "Quantera SXM" (available from ULVAC-PHI, Inc.) as the XPS machine under the following conditions.

(A1) X-ray source: Monochromatic AlKα
(A2) Photoelectron taking out angle: θ=75° C. (referring FIG. 3)
(A3) Charge correction: Correcting on the basis that C1s peak energy is 284.8 eV
(A4) Analytical region: 200 μm
(A5) Chamber pressure at analyzing: about 1×10$^{-6}$ Pa
(A6) Measuring depth (Escaping depth): about 5 nm or less The results of the analysis are shown in TABLE 1. When calculating the percentage $R_C$ (atom %) of the carbon of the support, the percentage $R_{Pd}$ (atom %) of the simple Pd, and the percentage $R_{Pt}$ (atom %) of simple Pt, the numerical value are calculated so that the sum of the three components is 100%.

<Measurement (ICP Analysis) of Support Rate>

With respect to the electrode catalyst of Example 1, the support rate of Pt (wt %) and the support rate of Pd (wt %) were measured by the following method.

The electrode catalyst of Example 1 was immersed in an aqua regia to dissolve the metal. Then, carbon as an insoluble component was removed from the aqua regia. Next, the aqua regia from which carbon has been removed was subjected to ICP analysis.

The results of the ICP analysis are shown in TABLE 1.

<Measurement (XRD Analysis) of Average Value of Crystallite Size>

With respect to the electrode catalyst of Example 1, an average value of crystallite size measured by powder X-ray diffraction (XRD) (an average value calculated from the peak of Pd(111) plane of the core part) was measured. The results are shown in TABLE 1.

Example 2

An electrode catalyst of Example 2 was prepared by using the same materials and the same preparation procedures as in Example 1 excepting that the electrode catalyst and the starting material thereof Pd/C powder (care particles) had the analytical data shown in TABLE 1.

With respect to the electrode catalyst of Example 2, the same XPS analysis, ICP analysis and XRD analysis as in Example 1 were conducted. The results are shown in TABLE 1.

Example 3

<Production of Electrode Catalyst>
["Pt/Pd/C" Powder]

As an electrode catalyst of Example 3, a "Pt/Pd/C" powder {Pt support rate 16.4 wt % (result of the ICP analysis), Trade name "NE-H10216-BD", available from N.E.CHEMNAT} was prepared by forming a shell part on the same "Pd/C" powder {Pd support rate 30 wt %, Trade name "NE-H00230-D", available from N.E.CHEMNAT} which was the same powder as used in Example 1.

The electrode catalyst of Example 3 was prepared by using the same materials and the same preparation procedures as in Example 1 excepting that the starting material Pd/C powder (core particle) had the analytical data shown in TABLE 1.

With respect to the electrode catalyst of Example 3, the same XPS analysis, ICP analysis and XRD analysis as in Example 1 were conducted. The results are shown in TABLE 1.

Example 4

<Production of Electrode Catalyst>
["Pt/Pd/C" Powder]

As an electrode catalyst of Example 4, a "Pt/Pd/C" powder {Pt support rate 17.6 wt % (result of the ICP analysis), Trade name "NE-H10218-BD", available from N.E.CHEMNAT} was prepared by forming a shell part on the same "Pd/C" powder {Pd support rate 30 wt %, Trade name "NE-H00230-D", available from N.E.CHEMNAT} which was the same powder as used in Example 1.

The electrode catalyst of Example 4 was prepared by using the same materials and the same preparation procedures as in Example 1 excepting that the starting material Pd/C powder (core particle) had the analytical data shown in TABLE 1.

With respect to the electrode catalyst of Example 4, the same XPS analysis, ICP analysis and XRD analysis as in Example 1 were conducted. The results are shown in TABLE 1.

Example 5

<Production of Electrode Catalyst>
["Pt/Pd/C" Powder]

As an electrode catalyst of Example 5, a "Pt/Pd/C" powder {Pt support rate 17.9 wt % (result of the ICP analysis), Trade name "NE-H10218-BD", available from N.E.CHEMNAT) was prepared by forming a shell part on the same "Pd/C" powder (Pd support rate 30 wt %, Trade name "NE-H00230-D", available from N.E.CHEMNAT} which was the same powder as used in Example 1.

The electrode catalyst of Example 5 was prepared by using the same materials and the same preparation procedures as in Example 1 excepting that the starting material Pd/C powder (core particle) had the analytical data shown in TABLE 1.

With respect to the electrode catalyst of Example 5, the same XPS analysis, ICP analysis and XRD Analysis as in Example 1 were Conducted. The Results are Shown in TABLE 1.

Example 6

<Production of Electrode Catalyst>
["Pt/Pd/C" Powder]

As an electrode catalyst of Example 6, a "Pt/Pd/C" powder {Pt support rate 18.1 wt % (result of the ICP analysis), Trade name "NE-H10218-BD", available from N.E.CHEMNAT}) was prepared by forming a shell part on the same "Pd/C" powder {Pd support rate 30 wt %, Trade name "NE-H00230-D", available from N.E.CHEMNAT} which was the same powder as used in Example 1.

The electrode catalyst of Example 6 was prepared by using the same materials and the same preparation procedures as in Example 1 excepting that the starting material Pd/C powder (core particle) had the analytical data shown in TABLE 1.

With respect to the electrode catalyst of Example 6, the same XPS analysis, ICP analysis and XRD analysis as in Example 1 were conducted. The results are shown in TABLE 1.

Example 7

<Production of Electrode Catalyst>
["Pt/Pd/C" Powder]

As an electrode catalyst of Example 7, a "Pt/Pd/C" powder {Pt support rate 17.6 wt % (result of the ICP analysis), Trade name "NE-H10218-BD", available from N.E.CHEMNAT) was prepared by forming a shell part on the same 'Pd/C' powder (Pd support rate 30 wt %, Trade name "NE-H00230-D", available from N.E.CHEMNAT} which was the same powder as used in Example 1.

The electrode catalyst of Example 7 was prepared by using the same materials and the same preparation procedures as in Example 1 excepting that the starting material Pd/C powder (core particle) had the analytical data shown in TABLE 1.

With respect to the electrode catalyst of Example 7, the same XPS analysis, ICP analysis and XRD analysis as in Example 1 were conducted. The results are shown in TABLE 1.

Example 8

<Production of Electrode Catalyst>
["Pt/Pd/C" Powder]

As an electrode catalyst of Example 8, a "Pt/Pd/C" powder {Pt support rate 18.1 wt % (result of the ICP analysis), Trade name "NE-H10218-BD", available from N.E.CHEMNAT} was prepared by forming a shell part on the same "Pd/C" powder {Pd support rate 30 wt %, Trade name "NE-H00230-D", available from N.E.CHEMNAT} which was the same powder as used in Example 1.

The electrode catalyst of Example 8 was prepared by using the same materials and the same preparation procedures as in Example 1 excepting that the starting material Pd/C powder (core particle) had the analytical data shown in TABLE 1.

With respect to the electrode catalyst of Example 8, the same XPS analysis, ICP analysis and XRD analysis as in Example 1 were conducted. The results are shown in TABLE 1.

Comparative Example 1

<Production of Electrode Catalyst>
["Pt/Pd/C" Powder where the Shell Part of Pt is Formed on Pd/C]

A "Pt/Pd/C" powder {Pt support rate: 23.5 wt % (result of ICO analysis), Trade name "NE-H10224-BC", available from N.E.CHEMNAT} where the shell part of Pt is formed on Pd of the particle of the following "Pd/C" powder was prepared as an electrode catalyst of Comparative Example 1.

This Pt/Pd/C powder was prepared by using the following Pd/C powder, forming a coating film of Cu on the surface of the core particle of Pd of Pd/C by means of a general Cu-UPD method, and then using potassium chloraplatinate to carry out the galvanic substitution reaction of Cu and Pt.

[Core Particle Supporting Carbon "Pd/C" Powder]

A "Pd/C" powder {Pd support rate: 30 wt %, Trade name "NE-H00230-C", available from N.E.CHEMNAT} where the core particles of the Pd are supported on a carbon black powder was prepared. This "Pd/C" powder is prepared by regulating the percentage $RO_{Pd}$ of the simple Pd in an analytical region near a surface measured by X-ray photoelectron spectroscopy (XPS) to less than 3.0 atom %.

The Pd/C powder was obtained by preparing a mixed solution of a commercially available carbon black powder (specific surface area of 750 to 800 m²/g), sodium tetrachloropalladate(II) and water, and adding a reducing agent thereto, and then reducing palladium ion in the solution so that the above $RO_{Pd}$ is less than 3.0 atom %.

With respect to the electrode catalyst of Comparative Example 1, the same XPS analysis, ICP analysis and XRD analysis as in Example 1 were conducted. The results are shown in TABLE 1.

Comparative Example 2

An electrode catalyst of Comparative Example 2 was prepared by using the same materials and the same preparation procedures as in Example 1 excepting that the electrode catalyst and the starting material thereof Pd/C powder had the analytical data shown in TABLE 1.

With respect to the electrode catalyst of Comparative Example 2, the same XPS analysis, ICP analysis and XRD analysis as in Example 1 were conducted. The results are shown in TABLE 1.

Comparative Example 3

<Production of Electrode Catalyst>
["Pt/Pd/C" Powder]

As an electrode catalyst of Comparative Example 3, a "Pt/Pd/C" powder {Pt support rate 15.4 wt % (result of the ICP analysis), Trade name "NE-H10215-BC", available from N.E.CHEMNAT} was prepared by forming a shell part on the same "Pd/C" powder {Pd support rate 30 wt %, Trade name "NE-H00230-C", available from N.E.CHEMNAT} which was the same powder as used in Example 1.

The electrode catalyst of Comparative Example 3 was prepared by using the same materials and the same preparation procedures as in Example 1 excepting that the starting material Pd powder (core particle) had the analytical data shown in TABLE 1.

With respect to the electrode catalyst of Comparative Example 3, the same XPS analysis, ICP analysis and XRD analysis as in Example 1 were conducted. The results are shown in TABLE 1.

Comparative Example 4

As a Pt/C catalyst, a Pt/C catalyst (Trade name: "NE-F50") having a Pt support rate of 50 wt % available from N.E.CHEMNAT was prepared. This catalyst was prepared by using the same support as of the electrode catalyst of Example 1.

<Surface Analysis of Core Particle by XPS>

With respect to the core particle of Pd/C powder as the starting material of the electrode catalysts in Example 1 to Example 3, Comparative Example 1 and Comparative Example 2, the surface analysis was conducted by the XPS to measure the percentage $RO_{Pd}$ (atom %) of the simple Pd and the percentage $RO_C$ (atom %) of the carbon of the support.

Specifically, the analysis was conducted by using "Quantera SXM" (available from ULVAC-PHI, Inc.) as the XPS machine under the same conditions (A1) to (A6) as the XPS analysis mentioned above for the catalyst particle.

The results of the analysis are shown in TABLE 1. The core particle of the Pd/C particle which was the starting material of Example 1 to Example 3 had a percentage $RO_{Pd}$ of the simple Pd of 3.0 atom % or more. To the contrary, the care particle of the Pd/C particle which was the starting material of Comparative Example 1 and Comparative Example 2 had a percentage $RO_{Pd}$ of the simple Pd of less than 3.0 atom %.

<Surface Observation and Structural Observation of Electrode Catalyst>

With respect to the electrode catalyst of Example 1 to Example 3, Comparative Example 1 and Comparative Example 2, the STEM-HAADF image and the EDS elemental mapping image were observed. As a result, it was confirmed that, in each case, the electrode catalyst had a structure where the catalyst particles having a core-shell structure where a layer of the shell part of Pt was formed on at least a part of the surface of the particle of the core part of Pd were supported on the electrically conductive carbon support referring to FIG.).

(II) Production of Composition for Forming Gas Diffusion Electrode

A powder of each of the electrode catalysts of Example 1 to Example 3 and Comparative Example 1 to Comparative Example 3 was weighted by an amount of about 8.0 mg, and was put into a sample bottle together with 2.5 mL of an ultrapure water, followed by mixing the same while irradiating an ultrasonic wave to produce a slurry (suspension) of the electrode catalyst.

Next, there was prepared a Nafion-ultrapure water solution by mixing 10.0 mL of an ultrapure water and 20 µL of an aques dispersion of a 10 wt % Nafion (registered trademark) (product name "DE1020CS" by Wako Chemical Ltd) in a different container.

2.5 mL of the Nafion-ultrapure water solution was slowly poured into the sample bottle containing the slurry (suspension) of the electrode catalyst, followed by thoroughly stirring the same at a room temperature for 15 min while irradiating an ultrasonic wave to obtain a composition for forming gas diffusion electrode.

(III) Formation of Electrode Layer on Electrode for Evaluation Test

For preparation of evaluation test of the electrode catalyst by a rotating disk electrode method (RDE method) mentioned after, a catalyst layer CL (referring to FIG. 5) containing a powder of the electrode catalyst of Example 1 to Example 3 and Comparative Example 1 to Comparative Example 3 were formed on the electrode surface of a rotating disk electrode WE (referring FIG. 5) according to the following manner.

Figure 5:
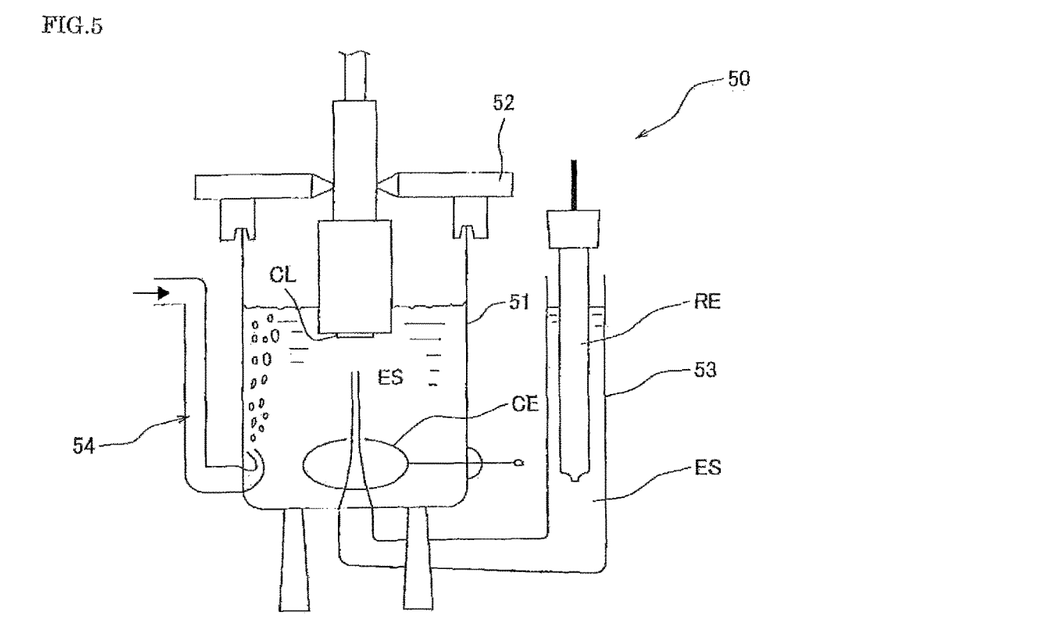
FIG. 5 is a schematic diagram showing a brief structure of the rotating disk electrode measuring machine provided with the rotating disk electrode used in the working examples.

Namely, the composition for forming gas diffusion electrode was taken out by an amount of 10 µL, and was dropped onto the clean surface of the rotating disk electrode WE. Thereafter, the composition was applied to the whole surface of the electrode of the rotating disk electrode WE to form a coating layer. The coating film made of the composition for forming gas diffusion electrode was dried under a temperature of 23° C. and a humidity of 50% RH for 2.5 hours to form the catalyst layer CL on the surface of the rotating disk electrode WE.

(IV) Evaluation Test of Catalyst Activity of Electrode Catalyst

Next, by using the rotating disk WE where the catalyst layer CL including the electrode catalyst of Example 1 was formed, the rotating disk WE where the catalyst layer CL including the electrode catalyst of Example 2 was formed, the rotating disk WE where the catalyst layer CL including the electrode catalyst of Example 3 was formed, the rotating disk WE where the catalyst layer CL including the electrode catalyst of Comparative Example 1 was formed, the rotating disk WE where the catalyst layer CL including the electrode catalyst of Comparative Example 2 was formed, the rotating disk WE where the catalyst layer CL including the electrode catalyst of Comparative Example 3 was formed, the evaluation test of catalyst activity and the evaluation test of durability were conducted according to the following manner.

In addition, a mass activity of platinum (Mass Act, mA/g-Pt) at +0.9 V (vs RHE) was measured by the rotating disk electrode method (RDE method) according to the following manner.

[Configuration of Rotting Disk Electrode Measuring Apparatus]

FIG. 5 is a schematic diagram showing a schematic configuration of a rotating disk electrode measuring device 50 used in the rotating disk electrode method (RDE method).

As shown in FIG. 5, the rotating disk electrode measuring device 50 mainly includes a measuring cell 51, a reference electrode RE, a counter electrode CE, and a rotating disk electrode WE. In addition, when evaluating the catalyst, an electrolyte solution ES was added to the measuring cell 51.

The measuring cell 51 has almost cylindrical shape having an opening at the upper surface, and a fixing member 52 of the rotating disk electrode WE which is also a gas-sealable rid is disposed at the opening. At the center of the fixing member 52, a gas-sealable opening is disposed for inserting and fixing the main body of the electrode of the rotating disk electrode WE into the measuring cell 51.

On the side of the measuring cell 51, an almost L-shaped Luggin tube 53 is disposed. Further one end of the Luggin tube 53 has a Luggin capillary which can be inserted into the inside of the measuring cell 51, the electrolyte solution ES of the measuring cell 51 also enters to the inside of the Luggin tube 53. The other end of the Luggin tube 53 has an opening, and the reference electrode RE can be inserted into the Luggin tube 53 from the opening.

As the rotating disk electrode measuring apparatus 50, "Model HSV110" available from Hokuto Denko Corp. was used. An Ag/AgCl saturated electrode was used as the reference electrode RE, a Pt mesh with Pt black was used as the counter electrode CE, and an electrode having a diameter of 5.0 mm$\varphi$, area of 19.6 mm$^2$ available from Glassy Carbon Ltd. was used as the rotating disk electrode WE. Further, $HClO_4$ of 0.1 M was used as the electrolyte solution ES.

[Cleaning Rotating Disk Electrode WE]

As shown in FIG. 5, after dipping the rotating disk electrode WE in the $HClO_4$ electrolyte solution ES within the above rotating disk electrode measuring apparatus 50, the oxygen in the electrolyte solution ES was purged for 30 minutes or more with an argon gas by introducing the argon gas from a gas introducing tube 54 which was connected to the side of the measuring cell 51 into the measuring cell 51.

Then, the sweeping was carried out for 20 cycles in the manner that the potential (vsRHE) of the rotating disk electrode WE to the reference electrode RE was so-called "potential sweeping mode of chopping waves" where the potential of the rotating disk electrode to the reference electrode RE was +85 mV to +1085 mV, and a scanning rate was 50 mv/sec.

[Evaluation of Electrochemical Area (ECSA)]
(i) Potential Sweeping Treatment

Figure 6:
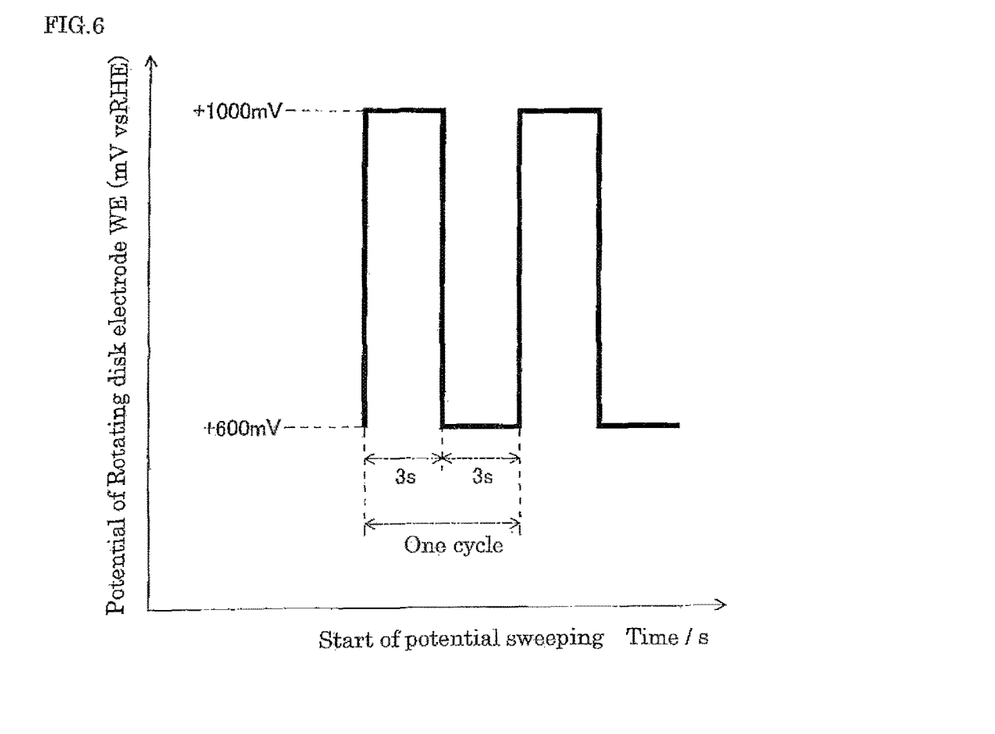
FIG. 6 is a graph showing the "potential sweep mode of rectangular wave" where the potential (vsRHE) of the rotating disk electrode WE with respect to the reference electrode RE in the working examples.

The sweeping was carried out of in the manner that the potential (vsRHE) of the rotating disk electrode WE to the reference electrode RE was so-called "potential sweeping mode of rectangular waves" as shown in FIG. 6.

More specifically, the potential sweeping where the following operations (A) to (E) were to be one cycle was carried out 6 cycles.

(A) Potential at the start of sweep: 4600 mV, (B) Sweeping from +600 mV to +1000 mV, (C) Keeping at +1000 mV for 3 seconds, (D) Sweeping from +1000 mV to 4600 mV, (E) Keeping at +600 mV for 3 seconds.

(ii) CV Measurement

Net, the CV measurement was carried out for 2 cycles in the manner that the potential (vsRHE) of the rotating disk electrode WE was so-called "potential sweeping mode of chopping waves" where a potential at the start of measurement was +119 mV, +50 mV to +1200 mV, a scanning rate was 50 mv/sec. The rotation speed of the rotating disk electrode WE was 1600 rpm.

From the result of the CV measurement of the second cycle, the initial ECSA value based on the hydrogen-attached and -detached waves was calculated. The results are shown in TABLE 1.

(iii) Pt Mass Activity Measurement

Next, after bubbling the electrolyte solution ES in the measuring cell 51 with an oxygen gas for 15 minutes or more, the CV measurement was carried out 10 cycles under the condition of so-called "potential sweeping mode of chopping waves" where the scanning potential was +135 mV to +1085 mV vsRHE, a scanning rate was 10 mv/sec, and the rotation speed of the rotating disk electrode WE was 1600 rpm.

The current value at a potential of the rotating disk electrode of +900 mV vsRHE was recorded.

In addition, by setting the rotation speed of the rotating disk electrode WE at 400 rpm, 625 rpm, 900 rpm, 1225 rpm, 2025 rpm, 2500 rpm, and 3025 rpm, the oxygen reduction (ORR) current measurement was carried out by one cycle.

Utilizing the results obtained from the CV measurement, the Pt mass activity (Mass ACT) (mA/μg-Pt@0.9V) was calculated. The results are shown in TABLE 1.

In TABLE 1, the values of the Pt mass activities (Mass ACT) are values of the Pt mass activities of the electrode catalysts (electrode catalysts of Example 1 to Example 8, Comparative Example 1 to Comparative Example 3) shown as a relative value when the Pt mass activity (Mass ACT) of the electrode catalyst (conventional Pt IC catalyst) of Comparative Example 4 is 1.00.

In TABLE 1, the values of the ECSA are values of the ECSA of the electrode catalysts (electrode catalysts of Example 1 to Example 8, Comparative Example 1 to Comparative Example 3) shown as a relative value when the ECSA of the electrode catalyst (conventional Pt/C catalyst) of Comparative Example 4 is 1.00.

TABLE 1

| Example Com. Ex | Structure | \multicolumn{4}{c}{XPS} | | | XRD Average value of crystallite size of |
|---|---|---|---|---|---|---|---|---|
| | | $100 \times R_{Pd}/(R_{Pd} + R_C)$ | $R_C$/atm % | $R_{Pd}$/atm % | $R_{Pt}$/atm % | Pd/wt % | Pt/wt % | Pd(111)/nm |
| EX. 1 | Pt/Pd/C | 2.18 | 96.56 | 2.15 | 1.28 | 25.00 | 16.80 | 5.0 |
| EX. 2 | Pt/Pd/C | 2.56 | 95.94 | 2.52 | 1.54 | 24.7 | 16.8 | 5.0 |

TABLE 1-continued

| | | | | | | | |
|---|---|---|---|---|---|---|---|
| EX. 3 | Pt/Pd/C | 2.32 | 96.26 | 2.29 | 1.45 | 24.9 | 16.4 | 5.5 |
| EX. 4 | Pt/Pd/C | 3.8 | 94.00 | 3.70 | 2.40 | 25.0 | 17.6 | 4.4 |
| EX. 5 | Pt/Pd/C | 4.40 | 93.10 | 4.30 | 2.70 | 25.2 | 17.9 | 3.4 |
| EX. 6 | Pt/Pd/C | 4.00 | 93.60 | 4.00 | 2.40 | 25.5 | 18.1 | 4.6 |
| EX. 7 | Pt/Pd/C | 4.40 | 93.00 | 4.40 | 2.70 | 25.1 | 17.6 | 4.5 |
| EX. 8 | Pt/Pd/C | 3.40 | 94.60 | 3.30 | 2.10 | 25.0 | 18.1 | 4.9 |
| Com. EX. 1 | Pt/Pd/C | 2.06 | 95.87 | 2.02 | 2.11 | 22.4 | 23.50 | 5.0 |
| Com. EX. 2 | Pt/Pd/C | 2.03 | 95.71 | 1.98 | 2.31 | 21.1 | 24.3 | 4.9 |
| Com. EX. 3 | Pt/Pd/C | 2.13 | 96.73 | 2.11 | 1.16 | 25.3 | 15.4 | 5.6 |
| Com. EX. 4 | Pt/C | — | — | — | — | 0 | 50 | 2.7 |

| Example Com. Ex | Results of analysis of electrode catalyst ESCA Relative value | Results of analysis of core particle | | XRD Average value of crystallite size of Pd(111)/nm | Results of evaluation of properties Mass Act @0.9 vs. RHE relative value |
|---|---|---|---|---|---|
| | | XPS | | | |
| | | $RO_C$/atm % | $RO_{Pd}$/atm % | | |
| EX. 1 | 2.4 | 96.65 | 3.35 | 4.1 | 4.96 |
| EX. 2 | 2.5 | 96.48 | 3.52 | 3.6 | 4.50 |
| EX. 3 | 2.2 | 96.94 | 3.06 | 4.1 | 4.33 |
| EX. 4 | 2.4 | 95.60 | 4.40 | 2.6 | 6.50 |
| EX. 5 | 2.4 | 95.20 | 4.80 | 2.3 | 5.08 |
| EX. 6 | 2.4 | 94.80 | 5.30 | 2.4 | 5.71 |
| EX. 7 | 2.4 | 94.30 | 5.70 | 2.5 | 5.46 |
| EX. 8 | 2.0 | 95.00 | 5.00 | 2.7 | 6.00 |
| Com. EX. 1 | 1.3 | 97.28 | 2.72 | 3.9 | 2.83 |
| Com. EX. 2 | 1.5 | 97.43 | 2.57 | 3.6 | 2.13 |
| Com. EX. 3 | 2.3 | 97.30 | 2.70 | 4.6 | 2.38 |
| Com. EX. 4 | 1.0 | — | — | — | 1.00 |

From the results shown in TABLE 1, in comparison with the electrode catalyst (conventional Pt/C catalyst) of Comparative Example 4, it has been clear that the electrode catalysts of Example 1 to Example 8 had larger Pt mass activity by 4 times or more.

Further, in comparison with the electrode catalysts (conventional Pt/Pd/C core-shell catalyst) of Comparative Example 1 to Comparative Example 3, it has been clear that the electrode catalysts of Example 1 to Example 8 had larger Pt mass activity by about twice to about 3 times.

As the above results, it has been clear that the electrode catalyst of the present embodiment has an excellent catalytic activity and can contribute to lowering of the cast of the PEFC.

APPLICABILITY TO INDUSTRIES

The electrode catalyst of the present invention has an excellent catalytic activity and can contribute to lowering of the cost of the PEFC.

Accordingly, the present invention is a type of electrode catalyst that can be used not only in fuel-cell vehicles and electrical equipment industries such as those related to cellular mobiles, but also in Ene farms, cogeneration systems or the like, and thus, shall make contributions to the energy industries and developments related to environmental technologies.

EXPLANATION OF SYMBOLS

2: Support
3, 3a: Catalyst particle
4: Core part
4s: Exposed surface of core part
6, 6a, 6b: Shell part
10, 10A: Electrode catalyst
40 Fuel cell stack 40
42: MEA
43: Anode
43a: Gas diffusion layer
43b: Catalyst layer
44: Cathode
45: Electrolyte membrane
46: Separator
48: Separator
50: Rotating disk electrode measuring machine
51: Measuring cell
52: Fixing member
53: Lubbin tube
CL: Catalyst layer
ES: Electrolyte solution
RE: Reference electrode
WE: Rotating disk electrode

The invention claimed is:

1. An electrode catalyst comprises:
a support containing carbon as a structural component, and
catalyst particles supported on the support,
wherein
the catalyst particle comprises a core part formed on the support, and a shell part formed so as to cover at least a part of a surface of the core part,
the core part contains simple Pd,
the shell part contains simple Pt, and
a percentage $R_C$ (atom %) of the carbon of the support and a percentage $R_{Pd}$ (atom %) of the simple Pd in an analytical region near a surface measured by X-ray photoelectron spectroscopy (XPS) satisfy the conditions of the following equation (2):

$$2.15 \leq [100 \times R_{Pd}/(R_{Pd}+R_C)] \leq 4.50 \quad (2).$$

2. The electrode catalyst according to claim 1, wherein the core part comprises the simple Pd, and the shell part comprises the simple Pt.

3. A composition for forming gas diffusion electrode which comprises the electrode catalyst according to claim 1.

4. A gas diffusion which is formed by using the composition for forming gas diffusion electrode which comprises the electrode catalyst according to claim 3.

5. A membrane-electrode assembly (MEA) comprising the gas diffusion electrode according to claim 4.

6. A fuel cell stack comprising the membrane-electrode assembly (MEA) according to claim 5.

7. A gas diffusion electrode which comprises the electrode catalyst according to claim 1.

* * * * *